United States Patent [19]

Guandalini

[11] Patent Number: 4,653,766
[45] Date of Patent: Mar. 31, 1987

[54] DEVICE RESULTING FROM THE COMBINATION OF A SCOOTER WITH A BICYCLE OPERATED BY THE RIDER'S WEIGHT

[76] Inventor: Leonardo Guandalini, P.zza Aldrovandi9, Bologna, Italy, 40100

[21] Appl. No.: 830,216

[22] Filed: Feb. 18, 1986

[30] Foreign Application Priority Data

Feb. 15, 1985 [IT] Italy .................................. 3338 A/85

[51] Int. Cl.⁴ .............................................. B62M 1/04
[52] U.S. Cl. .................................................. 280/226 R
[58] Field of Search ............... 280/226 R, 226 A, 227, 280/228, 221

[56] References Cited

U.S. PATENT DOCUMENTS

| | | | |
|---|---|---|---|
| 473,196 | 4/1892 | Moody | 280/226 R |
| 496,800 | 5/1893 | Stamp | 280/226 R |
| 4,045,048 | 8/1977 | Irwin | 280/221 X |
| 4,305,600 | 12/1981 | Mendez | 280/226 R |

FOREIGN PATENT DOCUMENTS

| | | | |
|---|---|---|---|
| 3001584 | 7/1981 | Fed. Rep. of Germany ... | 280/226 R |
| 556604 | 7/1923 | France | 280/226 R |
| 427135 | 11/1947 | Italy | 280/226 R |

*Primary Examiner*—John A. Pekar
*Attorney, Agent, or Firm*—Holman & Stern

[57] ABSTRACT

A device produced by the combination of a scooter with a bicycle, being provided at the rear of the frame (1) with a halved upright (11) connected with the rear wheel (14), on which two rods (18, 19) are hinged, sustaining at their ends the support (20) of the seat (21). Through the return spring (17), a chain (16) is engaged in the gear wheel (15) with free release, keyed on the axis of the rear wheel (14), said chain (16) having its end connected with the extension of the rod (18). The seat (21) is therefore fixed to an articulated quadrilateral joined with the frame (1) and the translation of the said seat (21), because of the effect of the rider's weight, drives the rear drive wheel (14).

4 Claims, 4 Drawing Figures

DEVICE RESULTING FROM THE COMBINATION OF A SCOOTER WITH A BICYCLE OPERATED BY THE RIDER'S WEIGHT

The invention relates to a device resulting from the combination of a scooter with a bicycle operated by the rider's weight. Transport, amusement and gymnastic means for both children and grown-up people, such as scooter and bicycle are known. While the scooter is driven discontinuously by the pressure of the user's foot against the floor, the street or the ground, the bicycle is operated by means of pedals driving the rearwheel through a chain. In both cases, drive is performed by the rider's lower limbs.

The invention as claimed is intended to afford a device for both children's and grown-up people's amusement, which provides good exercise for the user and which provides a novel form of drive mechanism.

The advantages afforded by the invention are mainly that the device has no pedals and is equipped with a footboard, as for a scooter, which can be operated not only by the foot pressure, but also, even if discontinuously, by the rider's weight, which makes the rear wheel turn through a chain driven by the lowering of the hinged seat. This particular drive assimilates the concerned device to a bicycle, where, on the other hand, the drive wheel can be continuously operated by the rider's lower limbs. Other objects and advantages, that will be better underlined below, are all achieved by the inventive subject-matter, characterized in that it is provided with a stiff middle frame obtained from shaped steel tubes or sheet box-type parts, so welded on each other as to get a not deformable frame, which is used as a footboard support and affords an element joining the remaining device parts, at the same time. Particularly, there is a support on the front of the said frame, that allows the steering fork to turn, joined with the front wheel and bearing the handlebar, adjustable according to the rider's requirements; said handlebar bearing in turn the grips, the brake lever and the handbell, as on a common bicycle; one of the grips, however, can turn, thus actuating the adjustable stroke end, which will be described later. At the rear of the above described not deformable frame, there is a bifurcated upright, on which the rear wheel support is fixed; said upright makes up one side of an articulated quadrilateral, at the opposite side of which the rider's seat is fastened through supports; said seat is both vertically and longitudinally adjustable according to the rider's requirements. The seat bearing side of the articulated quadrilateral is connected, through a return spring, with a chain engaged in the gear wheel keyed on the rear wheel axis; said gear wheel having a free release; the chain other end is fixed to the extension of one of the two remaining sides of the above mentioned articulated quadrilateral. The rider's weight makes the seat lower and, through the articulated quadrilateral motion, causes the chain engaged in the gear wheel to move and, as a result of the rear wheel turn, causes the device to move.

The rider, depressing the footboard and keeping the handle bar, now can rise again; the return spring withdraws the chain, thus placing the articulated quadrilateral in the initial position again, as well as the seat, which is in this way ready for the following operation. The previously mentioned free release of the gear wheel allows the mechanism to resume its initial arrangement, without interfering with the rear wheel motion.

The already mentioned adjustable stroke end acts on the above described extension of one articulated quadrilateral side, or on another likewise suited position. Said stroke end consists of a cam hinged on a support integral to the rear upright of the not deformable frame, that, when it is found on its free position, does not interfere with the articulated quadrilateral movements, while, at its stop position, it restricts the stroke of the quadrilateral side, it acts on, and, as a result, the whole articulated quadrilateral stroke. In this way, the seat lowering is limited, which allows for a more comfortable position to the rider, when he, having gained a good speed or being on a downhill road, wants to keep the sitting position without operating the rear drive wheel. Over the said rear wheel, there is the corresponding mudguard, the front end of which rests on the above mentioned extension of one articulated quadrilateral side, while the rear end is joined with the same extension through a stiff rod.

In this way, the seat lowering causes the rear mudguard to turn upwards, which results in a particular visual effect. One way of carrying out the invention is described in detials with reference to drawings, which illustrate only one specific embodiment, in which.

Figure 1:
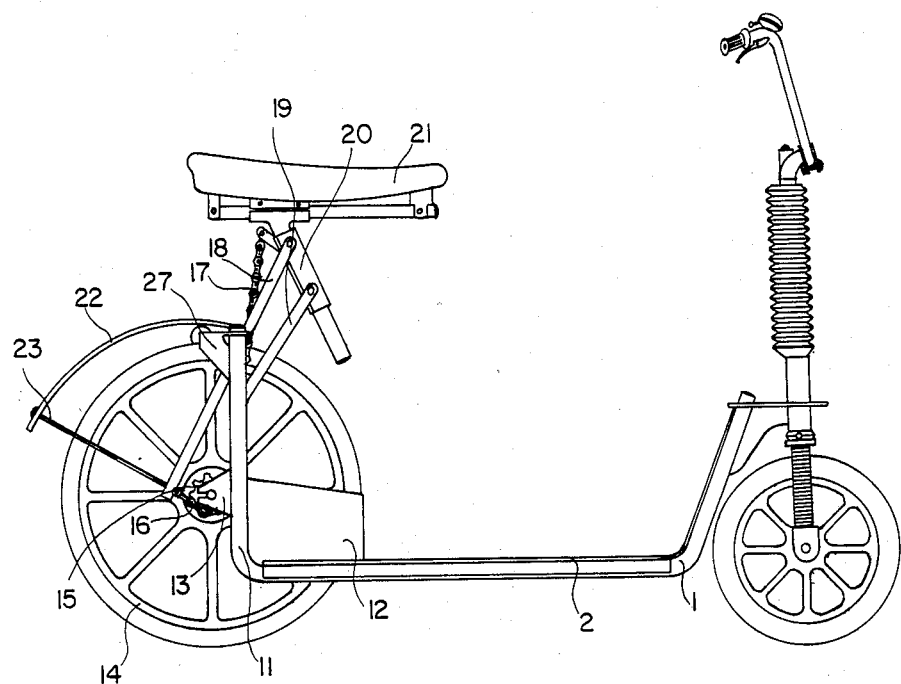
FIG. 1 shows a sideview of the device on the rest position (seat up)
Figure 2:
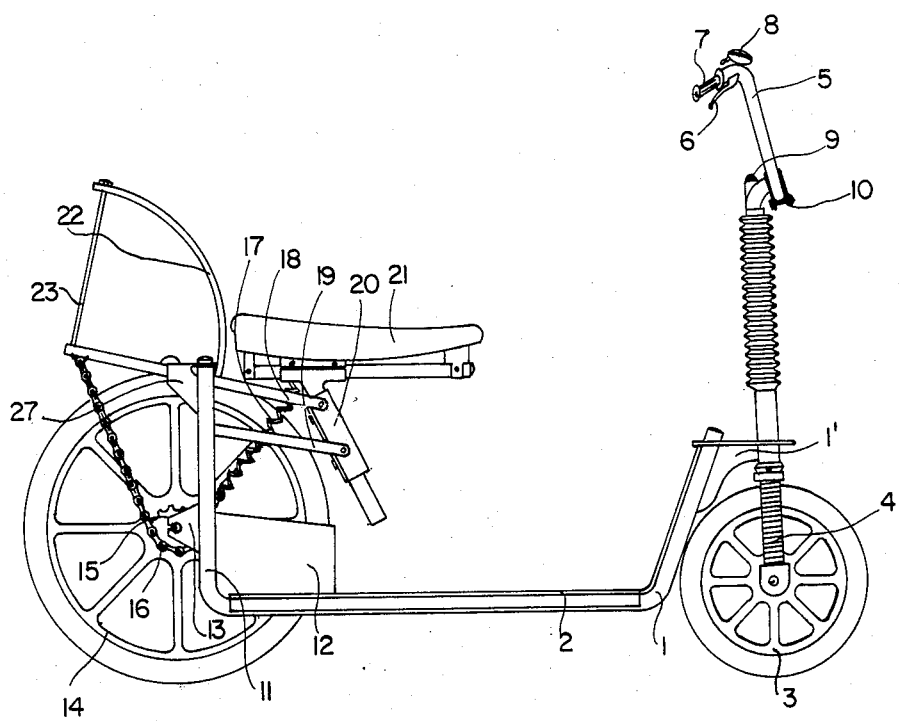
FIG. 2 shows another sideview of the device during the operation (seat down)

The figures show a device consisting of a frame 1 bearing the footboard 2. The front wheel 3 is sustained by the front fork 4 (joined with the frame 1 through a support 1') which can be made rotate using the adjustable handle bar 5 provided with the brake lever 6, the grips 7 and the bell 8. The handle bar is vertically adjusted through a clamp with spanner 9 and put on position using a nut 10. The rear halved upright 11 is connected with the support 13 of the rear wheel 14, on the axis of which the free-release gear wheel 15 is keyed, said rear wheel being complete with brake (the front wheel 13 can also be provided with a brake, as for a common bicycle). A guard 12 is fixed to the footboard 2 and to the upright 11. The gear wheel 15 is engaged in the chain 16, joined with an end of the return spring 17. Said spring is connected, at its opposite end, to the support 20 of the seat 21, while the opposite end of the chain 16 is connected with the extension of the rod 18 of the articulated quadrilateral, the remaining sides of which are composed of the rear halved upright 11 and of the rod 19, this latter being halved as the rod 18, and of the support 20 of the seat 21.

The rear end of the mudguard 22 is rigidly joined through a rod 23 with the rod 18, which is fixed to the mudguard front end; in this way, the mudguard rises whenever the seat 21 lowers.

Figure 3:
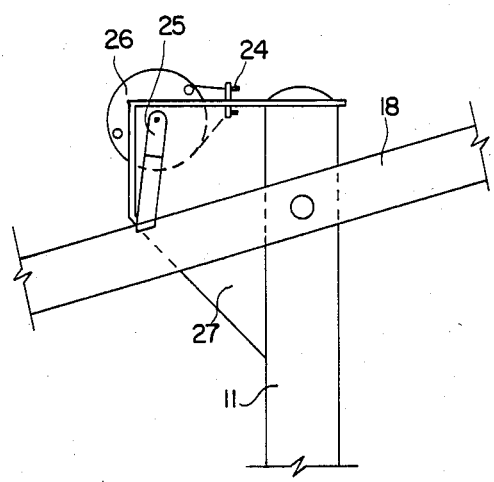
FIG. 3 shows a sectional view of the support integral to the rear upright of the not deformable frame, as well as the adjustable stroke end at the stop position.
Figure 4:
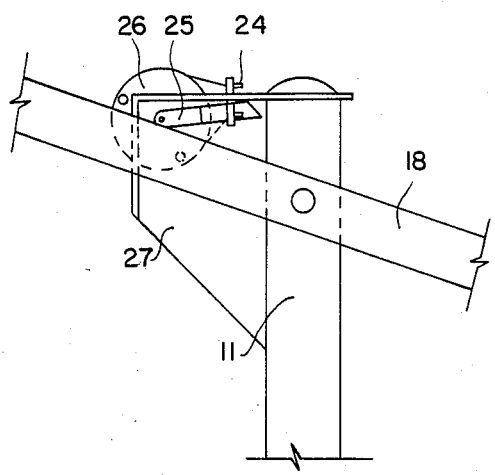
FIG. 4 shows the same part as shown in FIG. 3, but with the stroke end being released.

FIG. 3 and FIG. 4 show the way in which the grip 7 acts, through a flexible cable 24, on the adjustable stroke end 25 integral to the disc 26 hinged on the support 27.

In accordance with a preferred embodiment of the invention, both front and rear wheels can be: tyred, provided with spokes of various shapes, made of metal (as steel and light alloys) or of plastics, provided with shoe brake, disc brake or drum brake; the front wheel can be provided with mudguard or not; the frame can be made, as already stated, of shaped tubes or of box-type sheet; the handle bar can be damped with coaxial or separate damper and large spring; the footboard can be made of different materials (metals, wood or plastics) with rubber or plastic coating or similar; the frame and the footboard can be composed of two elements connected by a hinge, which can be locked, or the frame can consist of tubular elements suited to slide on each other, as to reduce the overall dimensions, when the device is not used; the seat can be vertically and longitudinally adjusted, as to match the various riders' sizes; the stroke end can be operated through levers instead of flexible cables and so forth.

I claim:

1. An occupant-powered wheeled vehicle having a frame with a forward end rotatably supporting a front fork provided with a steerable front wheel and handlebars, a central frame portion extending rearwardly from the forward end, a rear frame portion with an upright and a rear wheel rotatably supported thereon, and drive means for rotating the rear wheel under influence of the occupant's weight, the drive means including first and second links pivotally connected to the upright in vertically spaced positions on the upright, the links extending forwardly from the upright and having respective forward ends pivotally connected to a seat carrier member on which is mounted an occupant seat, the upright, links, and seat carrier member together defining an articulated quadralateral linkage for permitting up and down movement of the seat between an upper position and a lower position, one of said links having an extended portion rearwardly of the upright, a drive chain having one end connected to said rearwardly extended portion of the one link, the chain being wound around a one-way drive sprocket on the rear wheel and having another end secured to a return spring connected to the seat carrier member, the return spring biasing the seat carrier member to the upper position, the drive means being effective for rotating the rear wheel through actuation of the chain and sprocket responsive to downward movement of the seat carrier member from the upper position to the lower position accompanied by upward movement of the extended portion of said one link under influence of the occupants weight when sitting on the seat, the quadralateral linkage substantially maintaining the seat at a constant angle relative to the frame in the upper and lower positions.

2. A vehicle as defined in claim 1 including seat adjustment means for adusting the position of the seat both vertically and horizontally on the seat carrier member.

3. A vehicle as defined in claim 1 including a mudguard for the rear wheel, the mudguard having one end attached to said one of said links and another end attached to a rod extending from the rearwardly extending portion of the link whereby the mudguard is pivoted with the link.

4. A vehicle as defined in claim 1 including a rotary cam device on the upright with a locking member for engaging one of said links and restricting movement of the linkage, and a cable connection between the cam device and a handgrip on the handlebars for selectively positioning the locking member in and out of engagement with the link.

* * * * *